(12) United States Patent
Silva Zavalza et al.

(10) Patent No.: US 12,454,169 B2
(45) Date of Patent: Oct. 28, 2025

(54) VEHICLE SEALING ASSEMBLY

(71) Applicant: NISSAN NORTH AMERICA, INC., Franklin, TN (US)

(72) Inventors: Jose Francisco Silva Zavalza, Aguascalientes (MX); Samir Medina Capetillo, Aguascalientes (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/473,104

(22) Filed: Sep. 22, 2023

(65) Prior Publication Data

US 2025/0100360 A1  Mar. 27, 2025

(51) Int. Cl.

| B60J 10/76 | (2016.01) |
|---|---|
| B60J 10/15 | (2016.01) |
| B60J 10/27 | (2016.01) |
| B60J 10/34 | (2016.01) |
| B60R 13/02 | (2006.01) |

(52) U.S. Cl.
CPC .............. B60J 10/76 (2016.02); B60J 10/15 (2016.02); B60J 10/27 (2016.02); B60J 10/34 (2016.02); B60R 13/0243 (2013.01)

(58) Field of Classification Search
CPC ... B60J 10/21; B60J 10/50; B60J 10/75; B60J 10/76
See application file for complete search history.

(56) References Cited

U.S. PATENT DOCUMENTS

| 4,894,954 | A  * | 1/1990 | Nozaki | B60J 10/74 |
|---|---|---|---|---|
| | | | | 49/441 |
| 6,748,702 | B2 * | 6/2004 | Jang | B60J 10/30 |
| | | | | 428/131 |
| 10,035,411 | B2 * | 7/2018 | Toyota | B60J 10/50 |
| 10,239,399 | B2 * | 3/2019 | Masumoto | E06B 7/2312 |
| 10,434,857 | B2 * | 10/2019 | Walawender | B60J 10/76 |
| 11,110,782 | B2 * | 9/2021 | Morioka | B60J 10/75 |
| 11,660,944 | B2 * | 5/2023 | Uehata | B60R 13/0243 |
| | | | | 49/479.1 |
| 2007/0252405 | A1* | 11/2007 | Uno | B60J 10/24 |
| | | | | 296/107.04 |
| 2015/0202948 | A1* | 7/2015 | Saiki | B60J 10/70 |
| | | | | 49/502 |
| 2016/0355076 | A1* | 12/2016 | Suzuki | B60J 5/0418 |

FOREIGN PATENT DOCUMENTS

| JP | 4777045 B2 | 9/2011 |
|---|---|---|
| JP | 5891765 B2 | 3/2016 |
| JP | 6033629 B2 | 11/2016 |

* cited by examiner

*Primary Examiner* — Daniel J Troy
*Assistant Examiner* — Susan M. Heschel
(74) *Attorney, Agent, or Firm* — Global IP Counselors, LLP

(57) ABSTRACT

A sealing assembly for a vehicle includes a receptacle, a compressible member, and a sealing member. The receptacle is configured to be connected to a vehicle component. The compressible member is connected to the receptacle. The sealing member is connected to the compressible member. The sealing member is configured to engage a vehicle window.

18 Claims, 5 Drawing Sheets

US 12,454,169 B2

VEHICLE SEALING ASSEMBLY

BACKGROUND

Technical Field

The present disclosure generally relates to a sealing assembly for a vehicle. More specifically, the present disclosure relates to a sealing assembly that provides improved sealing between a glass run and the sealing assembly.

Background Information

Waist molding 110 is typically connected to a door inner panel to provide a seal between the door inner panel and a window panel, as shown in FIG. 1. An inner trim panel 112 is connected to the door inner panel. Movement of the window panel is guided by a glass run 114. A gap 116 between the glass run 114, the door inner trim panel 112 and the glass run 114 allows undesired noise to enter a vehicle cabin.

SUMMARY

An object of the present disclosure is to provide a sealing assembly for a vehicle that provides improved sealing.

In view of the state of the known technology, one aspect of the present disclosure is to provide a sealing assembly for a vehicle. The sealing assembly includes a receptacle, a compressible member, and a sealing member. The receptacle is configured to be connected to a vehicle component. The compressible member is connected to the receptacle. The sealing member is connected to the compressible member. The sealing member is configured to engage a vehicle window.

Another aspect of the present disclosure is to provide a vehicle sealing assembly including a door assembly, a glass run, and a sealing assembly. The door assembly includes an outer panel, an inner panel connected to the outer panel, and an interior trim panel connected to the inner panel. The glass run is connected to the outer panel of the door assembly. The glass run is configured to guide movement of a vehicle window. The sealing assembly is connected to the inner panel of the door assembly. The sealing assembly includes a receptacle, a compressible member, and a sealing member. The receptacle is connected to the glass run. The compressible member is connected to the receptacle. The sealing member is connected to the compressible member. The sealing member is configured to engage the vehicle window.

Also other objects, features, aspects and advantages of the disclosed vehicle sealing assembly will become apparent to those skilled in the art from the following detailed description, which, taken in conjunction with the annexed drawings, discloses exemplary embodiments of the vehicle sealing assembly.

BRIEF DESCRIPTION OF THE DRAWINGS

Referring now to the attached drawings which form a part of this original disclosure.

DETAILED DESCRIPTION OF EMBODIMENTS

Figure 1:
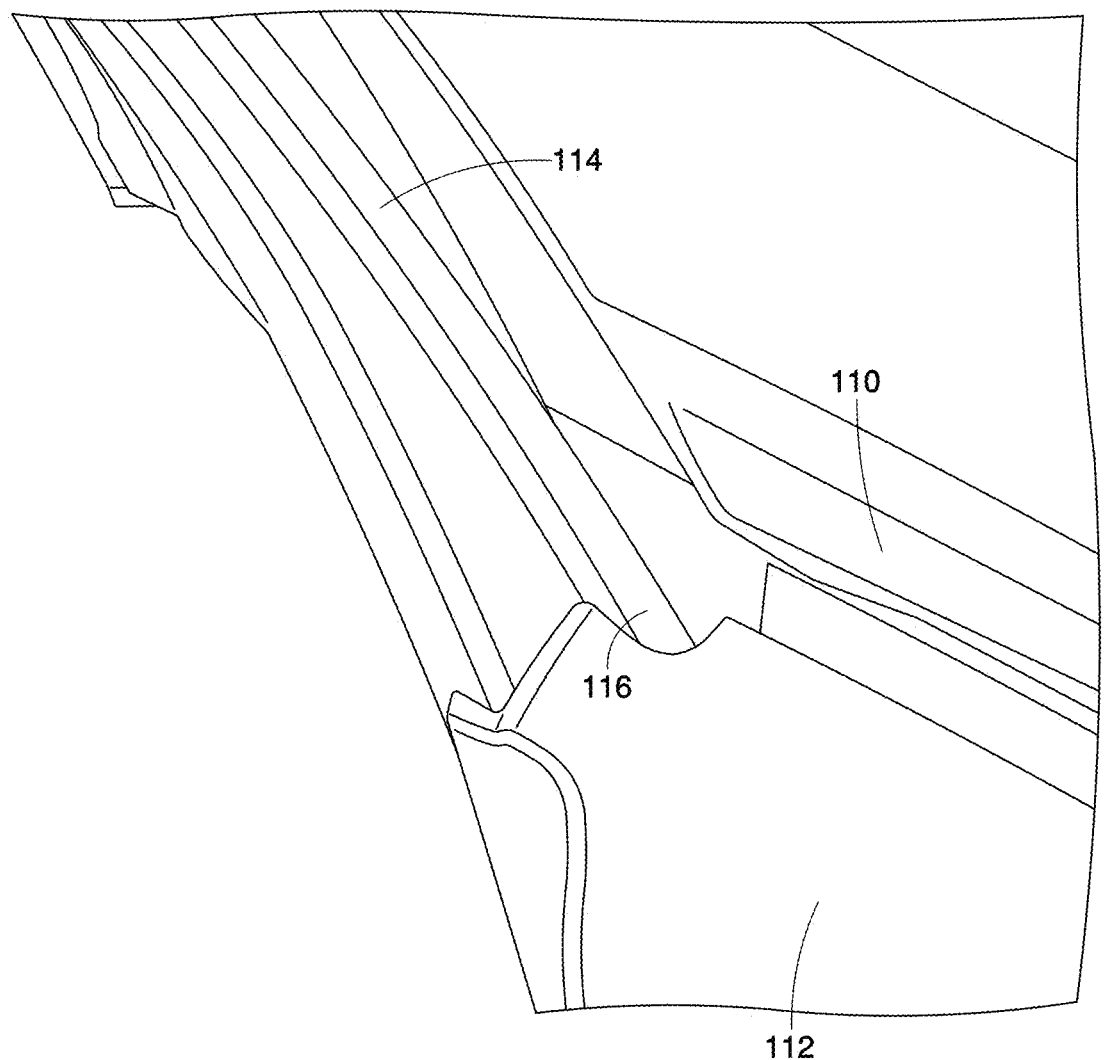
FIG. 1 is a perspective view of a conventional waist molding connected to a door inner panel.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A sealing assembly 10 for a vehicle 12 is illustrated in accordance with an exemplary embodiment, as shown in FIGS. 2-5. The sealing assembly 10 includes a receptacle 14, a compressible member 16 and a sealing member, or waist molding, 18. The receptacle 14 is configured to be connected to a vehicle component, such as a glass run 20. The compressible member 16 is connected to the receptacle 14. The sealing member 18 is connected to the compressible member 16. The sealing member 18 is configured to engage a vehicle window, or window panel, 22. The sealing assembly 10 provides improved sealing between the sealing assembly 10 and the glass run 20.

Figure 2:
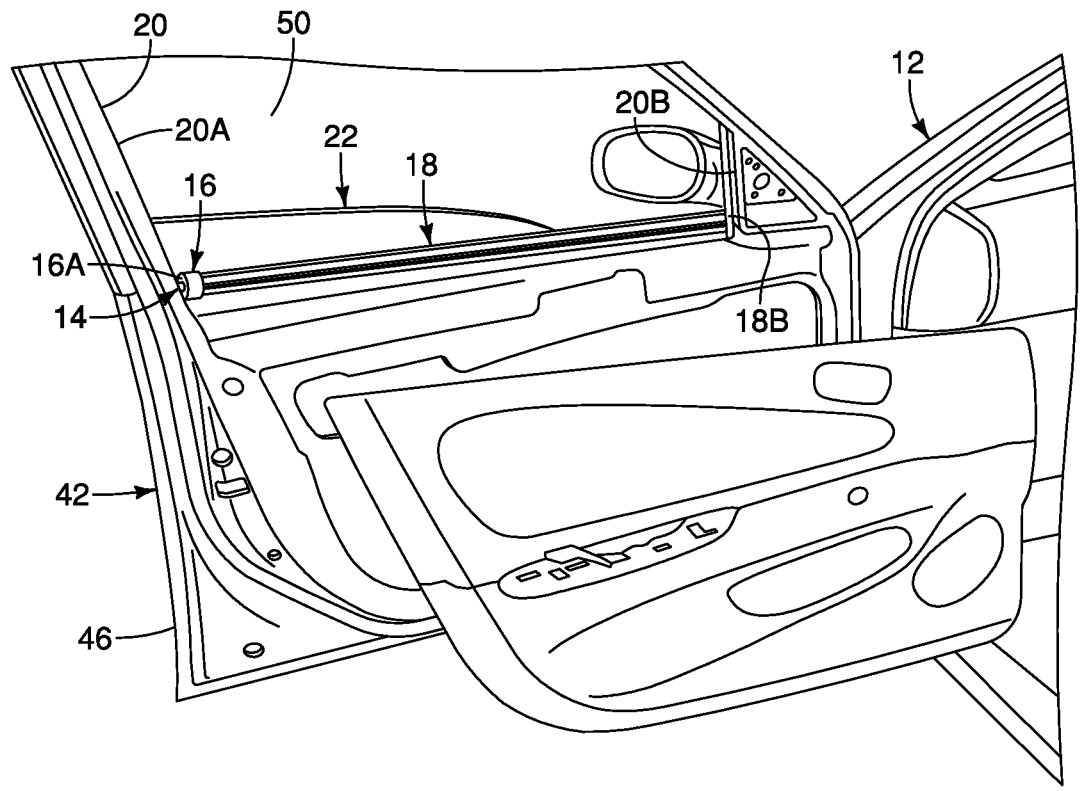
FIG. 2 is a perspective view of a sealing assembly in accordance with an exemplary embodiment.
Figure 3:
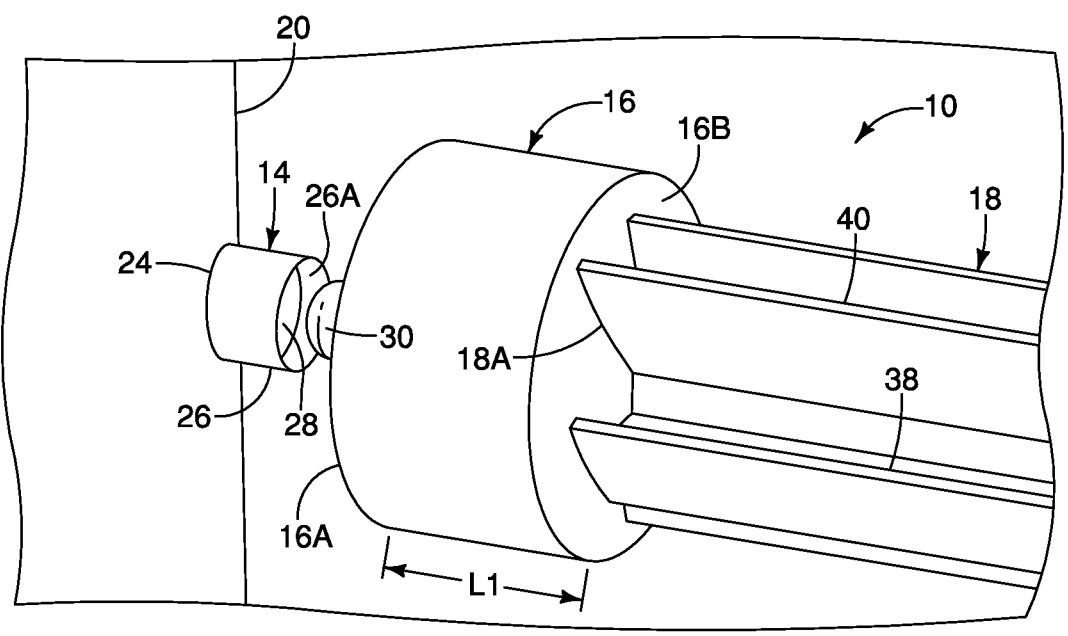
FIG. 3 is a perspective view of a receptacle, a compressible member and a sealing member of the sealing assembly of FIG. 2.

The receptacle 14 has a base 24 connected to the glass run 20, as shown in FIGS. 2 and 3. A wall 26 extends outwardly from the base 24. A cavity 28 is defined by the base and an inner surface 26A of the wall 26. The receptacle 14 is made of any suitable material, such as plastic, rubber or metal. The receptacle 14 is connected to the glass run 20 in any suitable manner, such as by ultrasonic or vibration welding.

Figure 4:
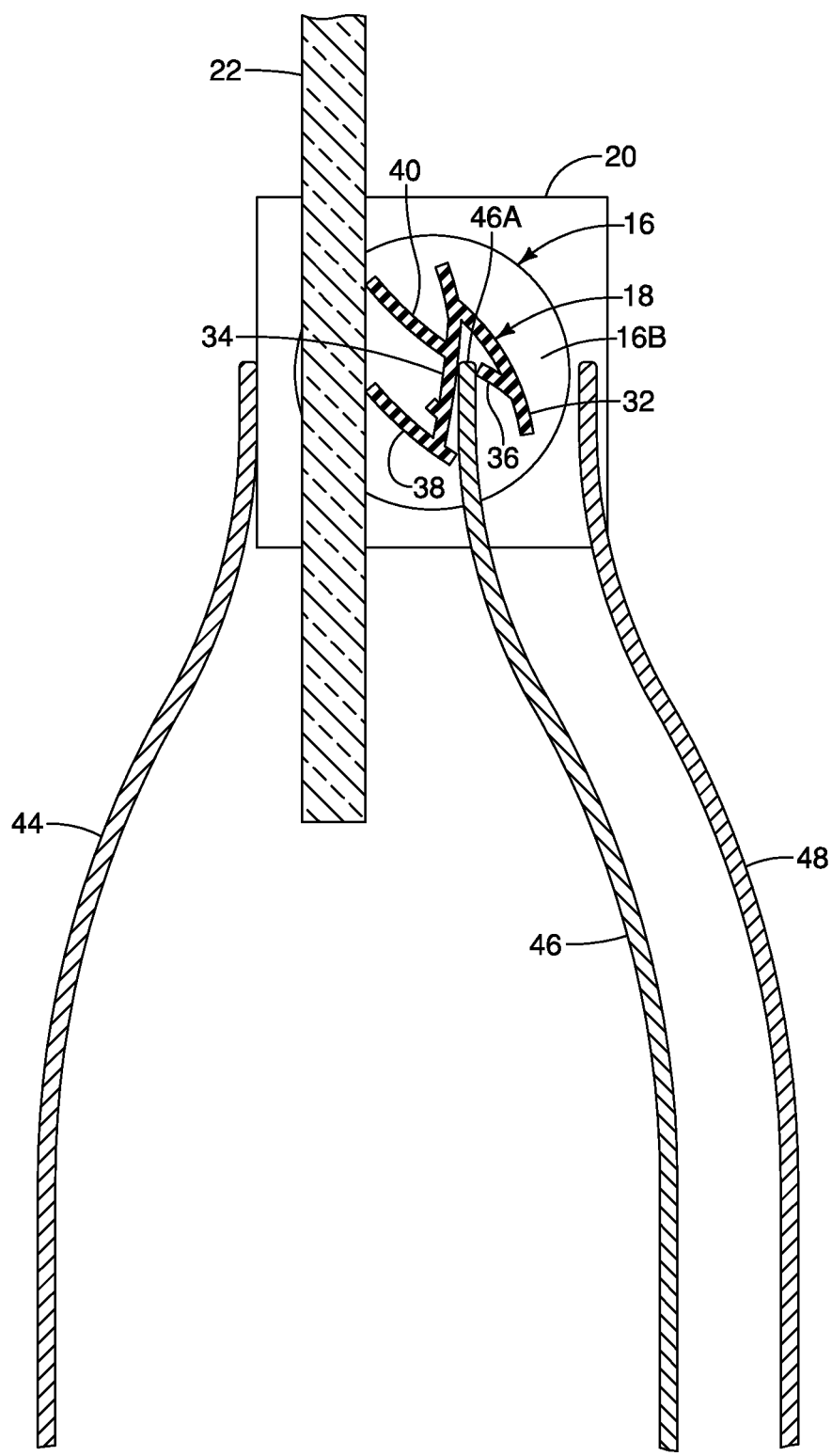
FIG. 4 is an elevational view of the sealing assembly of FIG. 2 connected to a door inner panel.

The compressible member 16 has a first planar surface 16A and a second planar surface 16B, as shown in FIGS. 2-4. The first planar surface 16A is substantially parallel to the second planar surface 16B. A protrusion 30 extends outwardly from the first planar surface 16A of the compressible member 16. The compressible member 16 is made of any suitable material, such as rubber. The compressible member 16 is illustrated as being substantially cylindrical, although the compressible member 16 can have any suitable shape, such as rectangular or triangular.

The sealing member, or waist molding, 18 has a first end 18A and a second end 18B, as shown in FIGS. 2 and 3. The first end 18A of the sealing member 18 is disposed in a vehicle rearward direction R of the second end 18B. The sealing member 18 preferably has a substantially uniform cross-section along the entire length of the sealing member, as shown in FIG. 4. The sealing member has a first leg 32 and a second leg 34 that form a substantially V-shaped opening. A retaining member 36 extends outwardly from the first leg 32 toward the second leg 34.

A first flexible lip 38 and a second flexible lip 40 extend outwardly from the second leg 34 of the sealing member 18, as shown in FIGS. 3 and 4. The first flexible lip 38 is disposed above the second flexible lip 40.

The sealing member 18 is made of any suitable material, such as rubber. The sealing member 18 is preferably unitarily formed as a one-piece member.

The vehicle 12 includes a door assembly 42, as shown in FIGS. 2 and 4. The door assembly includes a door outer panel 44, a door inner panel 46, and a door interior trim panel 48. The outer panel 44 and the inner panel 46 are made of any suitable material, such as metal. The interior trim panel 48 is made of any suitable material, such as plastic.

The glass run 20 provides a seal around an opening 50 in the door assembly 42 and guides movement of the window panel 22 in the opening, as shown in FIGS. 2-5. The glass run 20 is connected to the outer panel 44 and to the inner panel 46 in a conventional manner. The glass run 20 includes a channel to guide movement of the window panel 22.

The compressible member 16 is connected to the sealing member 18 prior to installing the sealing member 18 to the door assembly 42, as shown in FIG. 3. The compressible member 16 is preferably connected to the first, or rear, end 18A of the sealing member 18. In other words, the compressible member 16 is connected to a rearmost end of the sealing member 18. The sealing member 18 is connected to the compressible member 16 in any suitable manner, such as with an adhesive. The receptacle 14 is secured to the glass run 20 in a position aligned with an installation position of the sealing member 18. The receptacle 14 is secured to the glass run 20 in any suitable manner, such as by welding, such as by ultrasonic or vibration welding.

Figure 5:
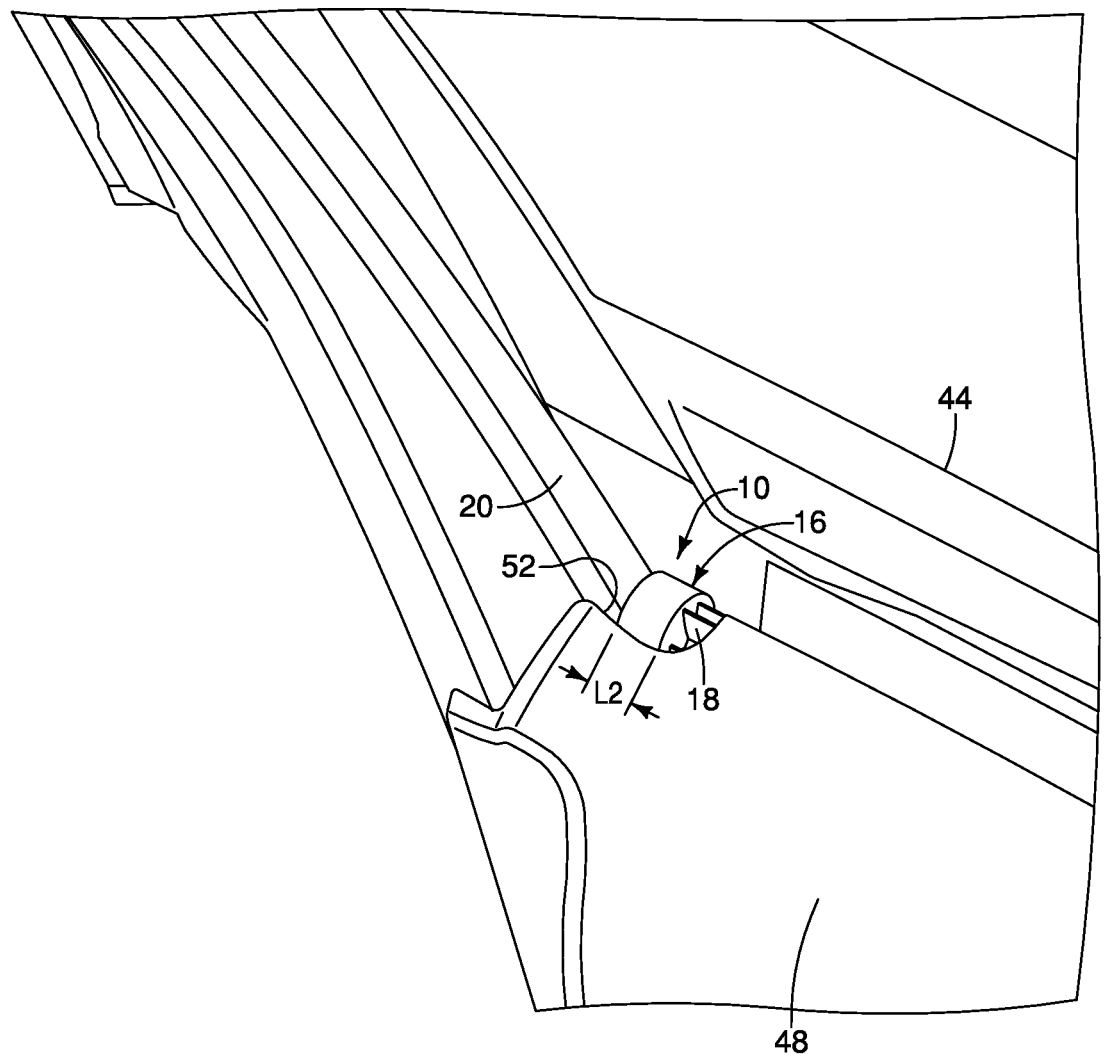
FIG. 5 is a perspective view of the sealing assembly of FIG. 2 connected to a glass run.

The sealing member 18 is then connected to the inner panel 46, as shown in FIGS. 2-5. An upper end 46A of the inner panel 46 is received in the V-shaped opening between the first leg 32 and the second leg 38. The retaining member 36 facilitates securely connecting the sealing member 18 to the inner panel 46. The sealing member 18 preferably has a length that extends in a forward direction to a forward end of the window opening 50, as shown in FIG. 2. In other words, the second end 18B of the sealing member 18 contacts or is disposed proximate a forwardmost end 20B of the glass run 20. The compressible member 16 has a length L1 when not compressed, as shown in FIG. 3. The compressible member 16 is compressed when installing the sealing member 18 to the inner panel 46, such that the protrusion 30 is received by the receptacle 14. The compressible member has a length L2 when compressed in the installed position, as shown in FIG. 5. The length L2 is less than the length L1. In other words, the compressible member 18 is configured to be compressed by the sealing member 18 when connecting the sealing assembly 10 to the inner panel 46 of the door assembly 42, as shown in FIGS. 2, 4 and 5.

A gap 52 is defined by the interior trim panel 48 and the glass run channel 20, as shown in FIG. 5. The sealing assembly 10 is disposed in the gap 52 to substantially eliminate noise produced through the gap 52. The sealing assembly 10 provides improved sealing between the sealing member 18 and the glass run 20. The compressible member 16 compresses during installation of the sealing assembly 10 to facilitate extending the sealing assembly through the gap 52 to improve sealing between the sealing member 18 and the glass run 20. The sealing assembly 10 substantially prevents wind noise leakage in the vehicle cabin.

Figure 6:
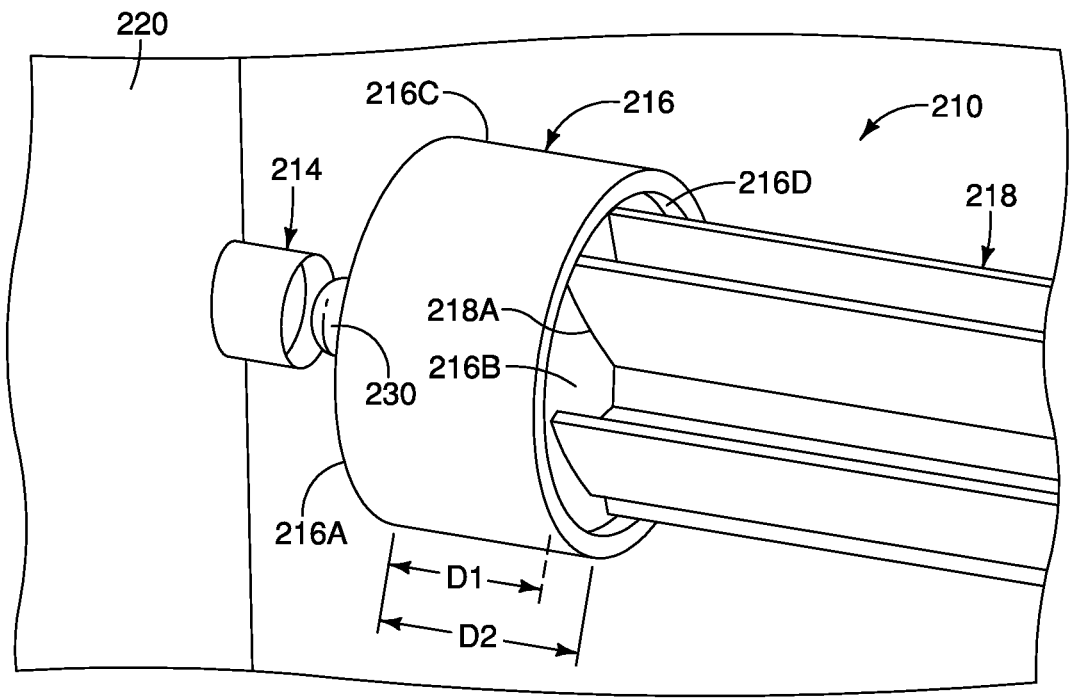
FIG. 6 is a perspective view of a compressible member of a sealing assembly in accordance with another exemplary embodiment.

As shown in FIG. 6, a vehicle sealing assembly 210 in accordance with another illustrated exemplary embodiment of the present invention is substantially similar to the vehicle sealing assembly 10 of the exemplary embodiment illustrated in FIGS. 2 to 5 except for the differences described below. Similar parts are identified with similar reference numerals, except increased by 200 (i.e., 2xx, accordingly).

The sealing assembly 210 includes a receptacle 214, a compressible member 216, and a sealing member 218. The receptacle 214 is connected to the glass run 220 in any suitable manner, such as by welding.

The compressible member 216 has a first planar surface 216A and a second planar surface 216B, as shown in FIG. 6. The first planar surface 216A is substantially parallel to the second planar surface 216B. A protrusion 230 extends outwardly from the first planar surface 216A of the compressible member 216. The compressible member 216 is made of any suitable material, such as rubber. The compressible member 216 is illustrated as being substantially cylindrical, although the compressible member 216 can have any suitable shape, such as rectangular or triangular.

A wall 216C extends outwardly from the first planar surface 216A, as shown in FIG. 6. A recess 216D is defined by the second planar surface 216B and the wall 216C. In other words, the wall 216C extends a first distance D1 from the first planar surface 216A. The second planar surface 216B is spaced a second distance D2 from the first planar surface 216A. The second distance D2 is less than the first distance D1. The recess 216D receives an end 218A of the sealing member 218. The sealing member 218 is connected to the second planar surface 216B in any suitable manner, such as with an adhesive. Alternatively, a cutout corresponding to the cross-section of the sealing member 218 can be formed in the second planar surface 216B of the compressible member 216 to receive the end 218A of the sealing member 218, and an adhesive can be used to further secure the sealing member 218 to the compressible member 216.

As shown in FIG. 6, a protrusion 230 extends outwardly from the first planar surface 216A of the compressible member 216. A receptacle 214 is connected to a glass run 220. The protrusion 230 is configured to be received by the receptacle 214 similarly to the sealing assembly 10 of FIGS. 2-5. The compressible member 216 is compressed by the sealing member 218 upon installing the sealing assembly 210 to the door assembly 42 (FIGS. 2 and 4).

Figure 7:
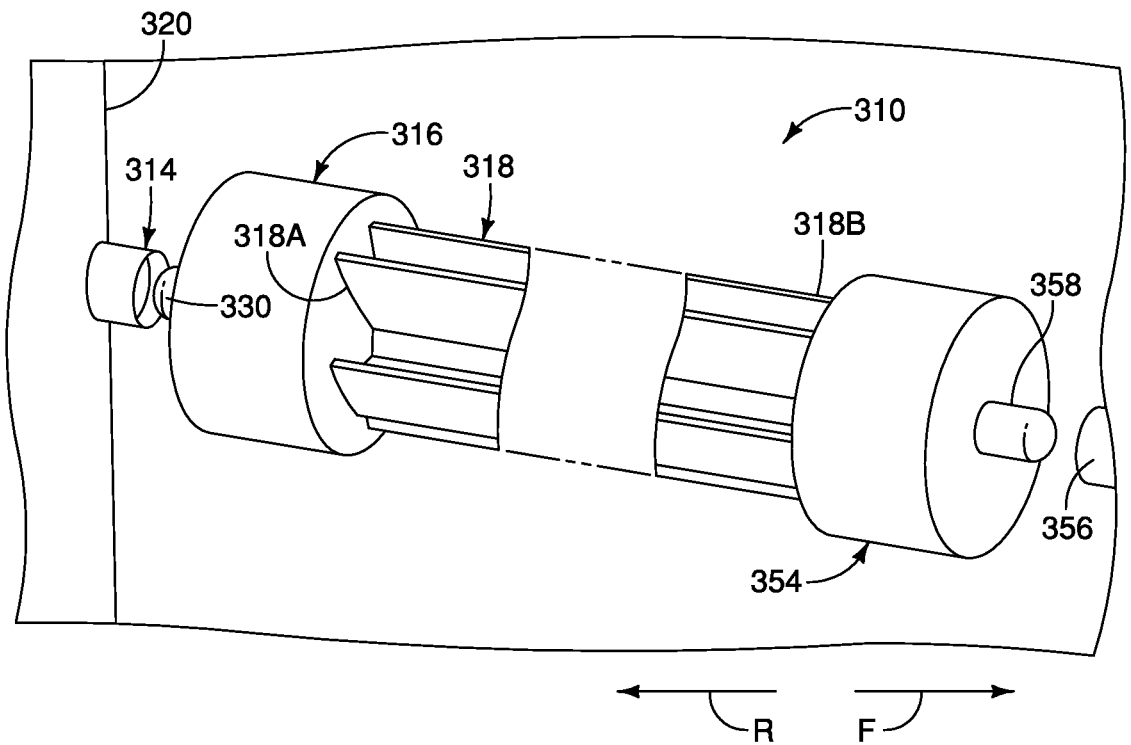
FIG. 7 is a perspective view of a sealing assembly in accordance with another exemplary embodiment.

As shown in FIG. 7, a vehicle sealing assembly 310 in accordance with another illustrated exemplary embodiment of the present invention is substantially similar to the vehicle sealing assembly 10 of the exemplary embodiment illustrated in FIGS. 2 to 5 except for the differences described below. Similar parts are identified with similar reference numerals, except increased by 300 (i.e., 3xx, accordingly).

The sealing assembly 310 includes a first compressible member 316 connected to a first, or rear, end 318A of a sealing member 318, as shown in FIG. 7. A second compressible member 354 is connected to a second, or forward, end 318B of the sealing member 318. A first receptacle 314 is configured to be connected to a rear end (20A, FIG. 2) of a glass run 320, and a second receptacle 356 is configured to be connected to a forward end (20B, FIG. 2) of the glass run 320. In other words, another compressible member 354 is connected to the forward end 318B of the sealing member 318.

The first compressible member 316 is configured to be received by the first receptacle 314, and the second compressible member 354 is configured to be received by the second receptacle 356. The first receptacle 314 is connected to the glass run 320 at a rear end of the glass run 320. The second receptacle 356 is connected to the glass run 320 at a forward end of the glass run 320.

A first protrusion 330 extending outwardly from the first compressible member 316 is received by the first receptacle 314, and a second protrusion 358 extending outwardly from the second compressible member 354 is received by the second receptacle 356. The first and second protrusions 330 and 358 extend in opposite directions. In other words, the first protrusion 330 extends in a vehicle rearward direction R, and the second protrusion 358 extends in a vehicle forward direction F. Providing the sealing member 318 with compressible members 316 and 354 disposed at opposite ends improves sealing between the sealing assembly 310 and rearward and forward ends of the glass run 320.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle sealing assembly. Accordingly, these terms, as utilized to describe the present invention should be interpreted relative to a vehicle equipped with the vehicle sealing assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sealing assembly for a vehicle comprising:
    a receptacle configured to be connected to a vehicle component;
    a compressible member connected to the receptacle; and
    a sealing member connected to the compressible member, the sealing member being configured to engage a vehicle window,
    the receptable being separately formed from the compressible member and the sealing member, and
    the compressible member having a first planar surface and a second planar surface, the first and second planar surfaces being substantially parallel, and the first planar surface facing the receptacle and the second planar surface contacting the sealing member.

2. The sealing assembly according to claim 1, wherein an end of the sealing member is connected to the compressible member with an adhesive.

3. The sealing assembly according to claim 1, wherein a protrusion extends outwardly from the first planar surface of the compressible member.

4. The sealing assembly according to claim 3, wherein the protrusion is received by the receptacle.

5. The sealing assembly according to claim 3, wherein a recess is formed in the compressible member.

6. The sealing assembly according to claim 5, wherein the recess receives an end of the sealing member.

7. The sealing assembly according to claim 1, wherein the compressible member is made of rubber.

8. A vehicle sealing assembly comprising:
    a door assembly including an outer panel, an inner panel connected to the outer panel, and an interior trim panel connected to the inner panel;
    a glass run connected to the outer panel of the door assembly, the glass run being configured to guide movement of a vehicle window; and
    a sealing assembly connected to the inner panel of the door assembly, the sealing assembly including
        a receptacle connected to the glass run;
        a compressible member connected to the receptacle; and
        a sealing member connected to the compressible member, the sealing member being configured to engage the vehicle window,
        the receptable being separately formed from the compressible member and the sealing member, and
        the compressible member having a first planar surface and a second planar surface, the first and second planar surfaces being substantially parallel, and the first planar surface facing the receptacle and the second planar surface contacting the sealing member.

9. The vehicle sealing assembly according to claim 8, wherein
    the compressible member is connected to a rear end of the sealing member.

10. The vehicle sealing assembly according to claim 8, wherein
    the receptacle is welded to the glass run.

11. The vehicle sealing assembly according to claim 9, wherein
    a protrusion extends outwardly from the first planar surface of the compressible member.

12. The vehicle sealing assembly according to claim 11, wherein
    the protrusion is received by the receptacle.

13. The vehicle sealing assembly according to claim 11, wherein
    a recess is formed in the compressible member.

14. The vehicle sealing assembly according to claim 13, wherein
    the recess receives an end of the sealing member.

15. The vehicle sealing assembly according to claim 8, wherein
    the compressible member is made of rubber.

16. The vehicle sealing assembly according to claim 8, wherein
    another compressible member is connected to a forward end of the sealing member.

17. The vehicle sealing assembly according to claim 9, wherein
    the sealing member is connected to the compressible member with an adhesive.

18. The vehicle sealing assembly according to claim 8, wherein
the compressible member is configured to be compressed by the sealing member when connecting the sealing assembly to the inner panel of the door assembly.

* * * * *